H. HOWELL.
Thill-Coupling.

No. 200,793. Patented Feb. 26, 1878.

Attest:
H. R. Perrine
Floyd Norris

Inventor.
Hamilton Howell
By Johnson & Johnson
Atty's

UNITED STATES PATENT OFFICE.

HAMILTON HOWELL, OF SALEM, OHIO.

IMPROVEMENT IN THILL-COUPLINGS.

Specification forming part of Letters Patent No. 200,793, dated February 26, 1878; application filed January 30, 1878.

*To all whom it may concern:*

Be it known that I, HAMILTON HOWELL, of Salem, in the county of Columbiana and State of Ohio, have invented certain new and useful Improvements in Thill-Couplings; and I do hereby declare that the following is a full, clear, and exact description thereof, which will enable others skilled in the art to which it appertains to make and use the same, reference being had to the accompanying drawings, and to letters of reference marked thereon, which form a part of this specification.

My improved thill-coupling is designed with special reference to its capacity for adjustment in attaching the thill-irons to the clips, or removing them therefrom for the attachment of the pole, and in rendering the coupling strong and safe.

An adjustable cap-plate forms the top of the bearing-box for the cross-head of the thill-iron. This cap-plate is slotted at its rear end, and is secured by a clamp-screw to the clip-box between the side of the clip and the raised edges of said clip-box, so that when secured it is prevented from having lateral or endwise movement. This construction allows the thill or pole irons to be easily secured in place, or removed from the clip-box without taking off the cap-plate. For this purpose the slot allows the front end of the cap-plate to be moved to one side over the raised edges, and then to be drawn endwise across the top of the box, when the clamp-screw is loosened, so as to expose the socket-bearing of the box, and allow the cross-head of the thill-iron to be inserted or removed therefrom, and the cap-plate again turned into position and clamped between the raised box-edges.

A cushion of rubber, leather, or other suitable material is intervened between the cap-plate and the thill cross-head, to prevent rattling, and, being secured at its rear end by the clamp-screw, is turned to one side with the cap-plate, and when secured in place it lies between the raised sides of the box. By this construction and arrangement the cap-plate and the cushion are turned out of the way together, when required, upon the clamp-screw as a pivot.

The box has a front opening, and the cap-plate and cushion corresponding notches, to receive and allow of the proper movements of the thill-irons.

The device is simple and safe, and avoids the use of the usual screw-bolts.

Figure 1:
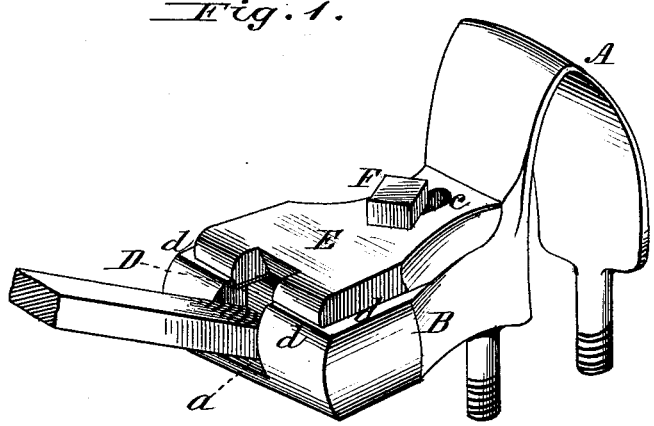
Figure 2:
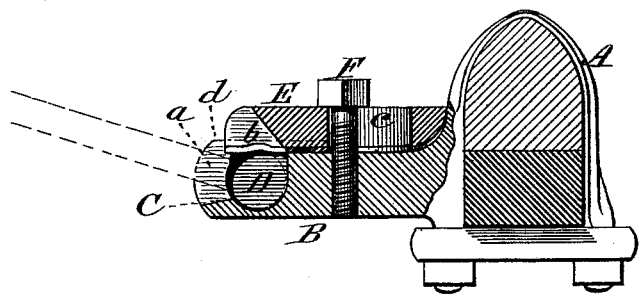
Figure 3:
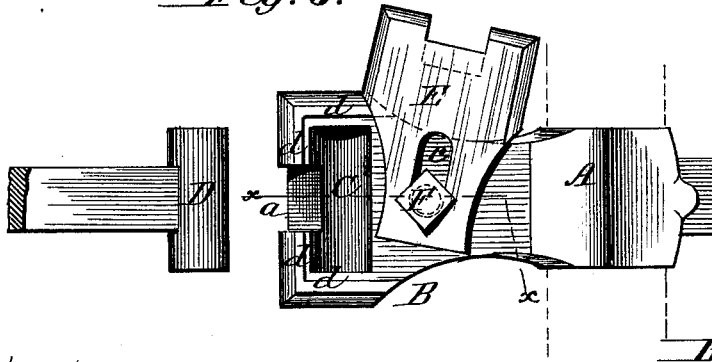

Referring to the drawings, Figure 1 represents my improved thill-coupling; Fig. 2, a section thereof; and Fig. 3, a top view of the clip, showing the cap-plate turned out from over the bearing-box, and upon its securing-bolt as a pivot, and the thill-iron removed.

The clip A has an open-top box projection, B, at its front side, and the clip is secured to the axle of the vehicle in any suitable manner. The box forms a bearing and seat-holder, C, for the cross-head D of the thills or pole. An opening, $a$, is formed in the front of the box to allow the thill or pole irons to work in, while the cross-head, which is cylindrical, fits and works closely in the box. A cap-plate, E, closes the top of the box, and bears upon and holds the cross-head in place. The contact of these two parts, however, is interrupted by a rubber or other cushion, $b$, to prevent rattling.

The cap-plate has a slot, $c$, to allow it to be swiveled round to one side to uncover the box-bearing when the screw F is loosened, by which the cap-plate is secured in place. The slot $c$ in the cap-plate is made in its rear end, and in line with the thill-iron, and the screw passes through it into the box projection.

The front and sides of the box are raised above the top surface, to form top shoulders $d$, between which the front end of the cap-plate and the cushion $b$ fits, and by which they are prevented from working forward or to either side, in case the screw-bolt should work loose. The side shoulders $d$ only extend a short distance back of the front end of the box.

When it is required to remove the cap-plate to use the pole in place of the thills, the screw is loosened, and the cap-plate and cushion raised and turned to one side over the shoulders, and then drawn endwise across the top of the box, the clamp-screw serving as the pivot for such adjustment, so that the securing cap-plate is not taken off, but only turned out of the way for the purpose stated. The front ends of the cap-plates and cushions are notched to correspond with the front opening $a$ in the box, to allow for the movements of the coupling-irons.

The manner of securing the cushions allows them to be easily replaced, or additional thin cushions placed thereon, whenever it is found necessary to keep the couplings tight, and prevent all rattling noise.

I claim—

1. The cap-plate having a slot, and combined with the clamp-screw bolt, the clip-box, and the cross-head coupling, as described.

2. The clip-box having the raised front and side top shoulders, in combination with the adjustable cap-plate, the cushion, and the clamp-screw, as set forth.

3. The combination, in a thill or pole coupling clip, of the box, the cross-head irons, the horizontal adjustable cap-plate, the cushion, and the clamp-screw, all constructed as and for the purpose herein set forth.

In testimony that I claim the foregoing I have affixed my signature in the presence of two witnesses.

HAMILTON HOWELL.

Witnesses:
ALLEN A. THOMAS,
PETER AMBLER.